United States Patent
Nakano

(10) Patent No.: US 10,197,892 B2
(45) Date of Patent: Feb. 5, 2019

(54) IMAGE PICKUP APPARATUS RESISTANT TO ENVIRONMENTS, AND IMAGE MONITORING SYSTEM

(71) Applicant: CANON KABUSHIKI KAISHA, Tokyo (JP)

(72) Inventor: Yoshitaka Nakano, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 15/499,135

(22) Filed: Apr. 27, 2017

(65) Prior Publication Data

US 2017/0315427 A1  Nov. 2, 2017

(30) Foreign Application Priority Data

Apr. 28, 2016  (JP) ................. 2016-090977

(51) Int. Cl.
  *G03B 17/55* (2006.01)
  *G01K 1/14* (2006.01)
  *H04N 5/225* (2006.01)
  *H04N 7/18* (2006.01)
  *G05D 23/00* (2006.01)

(52) U.S. Cl.
  CPC .............. *G03B 17/55* (2013.01); *G01K 1/14* (2013.01); *G05D 23/00* (2013.01); *H04N 5/2252* (2013.01); *H04N 5/2256* (2013.01); *H04N 7/183* (2013.01)

(58) Field of Classification Search
  CPC ...... G03B 17/55; H04N 7/183; H04N 5/2252; H04N 5/2256; G01K 1/14; G05D 23/00
  USPC ......................................................... 348/373
  See application file for complete search history.

(56) References Cited

U.S. PATENT DOCUMENTS

| | | | | |
|---|---|---|---|---|
| 4,414,576 A * | 11/1983 | Randmae | ............ | H04N 5/2252 219/201 |
| 6,061,087 A * | 5/2000 | Schieltz | ........... | G08B 13/19619 348/151 |
| 7,440,025 B2 * | 10/2008 | Cheng | ............. | G08B 13/19619 348/122 |
| 8,511,915 B2 * | 8/2013 | Lee | ........................ | G03B 17/55 348/143 |
| 8,964,042 B2 * | 2/2015 | Nozawa | ............... | H04N 5/2252 348/208.3 |
| 9,392,149 B2 * | 7/2016 | Grotto | .................... | G03B 17/55 |
| 9,525,809 B2 * | 12/2016 | Kondou | ................. | G03B 17/02 |
| 9,908,158 B2 * | 3/2018 | Koelmel | .................. | B08B 5/02 |
| 9,939,859 B2 * | 4/2018 | Kilgore | .................... | G06F 1/203 |

(Continued)

FOREIGN PATENT DOCUMENTS

JP  5776020 B2  9/2015

*Primary Examiner* — Pritham Prabhakher
(74) *Attorney, Agent, or Firm* — Carter, Deluca, Farrell & Schmidt LLP

(57) ABSTRACT

An image pickup apparatus which is able to obtain an image with high sharpness within a short period of time using a simple structure when operated in a low-temperature environment. A lens unit and a heater are provided in an internal space of a main case, and the internal space is divided into a first closed space and a second closed space via an opening, which is opened and closed by a valve member. A detecting unit detects a temperature in the internal space. An opening and closing unit opens and closes the valve member. A control unit controls opening and closing actions of the valve member.

11 Claims, 7 Drawing Sheets

(56) References Cited

U.S. PATENT DOCUMENTS

| | | | | |
|---|---|---|---|---|
| 2002/0140848 | A1* | 10/2002 | Cooper | G08B 13/19619 |
| | | | | 348/373 |
| 2005/0276599 | A1* | 12/2005 | Kajino | H04N 5/2252 |
| | | | | 396/419 |
| 2008/0055409 | A1* | 3/2008 | Mars | G03B 37/02 |
| | | | | 348/143 |
| 2012/0177357 | A1* | 7/2012 | Lee | G03B 17/55 |
| | | | | 396/427 |
| 2012/0212664 | A1* | 8/2012 | Hou | H04N 5/2257 |
| | | | | 348/374 |
| 2013/0062228 | A1* | 3/2013 | Danilov | G02B 27/0006 |
| | | | | 206/216 |
| 2015/0049242 | A1* | 2/2015 | Kondou | G03B 17/02 |
| | | | | 348/374 |
| 2015/0264228 | A1* | 9/2015 | Grotto | G03B 17/55 |
| | | | | 348/373 |
| 2017/0269650 | A1* | 9/2017 | Kilgore | G06F 1/203 |

* cited by examiner

IMAGE PICKUP APPARATUS RESISTANT TO ENVIRONMENTS, AND IMAGE MONITORING SYSTEM

BACKGROUND OF THE INVENTION

Field of the Invention

The present invention relates to an image pickup apparatus such as a surveillance camera, and in particular to an image pickup apparatus that is resistant to environments and used in low-temperature environments and environments where temperature widely varies, and an image monitoring system.

Description of the Related Art

A surveillance camera which is able to remotely monitor an image is required to be resistant to environments such as a sudden temperature change of an installation environment and installation in a place below freezing.

A sudden temperature decrease of an installation environment causes condensation to form inside a surveillance camera, and in particular, condensation on an image pickup means and a light transmissive cover, which protects the image pickup means, leads to a degradation in a sharpness of a captured image. In a surveillance camera that has high airtightness so as to ensure water resistance, moisture contained in air in a case resists shifting to outside, and hence condensation tends to occur.

Further, in a low-temperature environment such as below freezing, moisture included in air inside the case of the surveillance camera tends to escape due to a decrease in saturation water vapor pressure, and hence condensation tends to occur and freeze into frost. Therefore, measures against frosting as well as condensation need to be taken. Moreover, in a low-temperature environment, changes in conditions of sliding portions, fitting portions, and areas concerned with ease of sliding such lubricating oil in a lens drive unit for a focus lens, which constitutes an image pickup means, and other drive units may lead to degradation of focusing performance. For this reason, the sliding portions, fitting portions, and areas concerned with ease of sliding such lubricating oil need to be heated to a predetermined temperature so as to avoid a degradation of focusing performance.

To adjust a temperature inside a camera case, there has conventionally been proposed a technique according to which a wind passage is provided around a lens barrel to efficiently prevent condensation so that warmed air can positively strike a front window in a front area of an image pickup means as seen in a direction of an optical axis (see Japanese Patent No. 5776020).

When a surveillance camera is started in a low-temperature environment such as below freezing, electric components such as an image pickup device and a power source are heated to high temperatures, and hence moisture frosted on surfaces of those electric components is evaporated into air. Due to waterproofing performance, the evaporated moisture wafts in inside air without escaping to outside, touches the front window that has been cooled to below freezing, and precipitates as frost. This may lead to degrading a sharpness of a captured image.

According to Japanese Patent No. 5776020, however, causing air including moisture to positively striking the front window fosters precipitation of frost. Moreover, in order to melt frost that has been formed, all of air inside the case needs to be satisfactorily warmed, and hence it may take time until frosting or condensation is eliminated.

Similarly, when sliding portions of a lens drive unit and others are desired to be warmed, all of air inside the case must be satisfactorily warmed. Therefore, it takes time until the sliding portions are warmed, and hence it may take time until an image with high sharpness is obtained.

SUMMARY OF THE INVENTION

The present invention provides an image pickup apparatus which is able to obtain an image with high sharpness within a short period of time using a simple structure when operated in a low-temperature environment, and an image monitoring system.

Accordingly, the present invention provides an image pickup apparatus comprising a main case configured to have, in an internal space thereof, a lens unit and a heater, the internal space being divided into a first closed space and a second closed space via an opening, a valve member configured to open and close the opening, a detecting unit configured to detect a temperature of the internal space, an opening and closing unit configured to open and close the valve member, and a control unit configured to control opening and closing actions of the valve member.

According to the present invention, when operated in a low-temperature environment, the image pickup apparatus is able to obtain an image with high sharpness within a short period of time using a simple structure.

Further features of the present invention will become apparent from the following description of exemplary embodiments (with reference to the attached drawings).

DESCRIPTION OF THE EMBODIMENTS

Hereafter, embodiments of the present invention will be described with reference to the drawings.

Figure 1A:
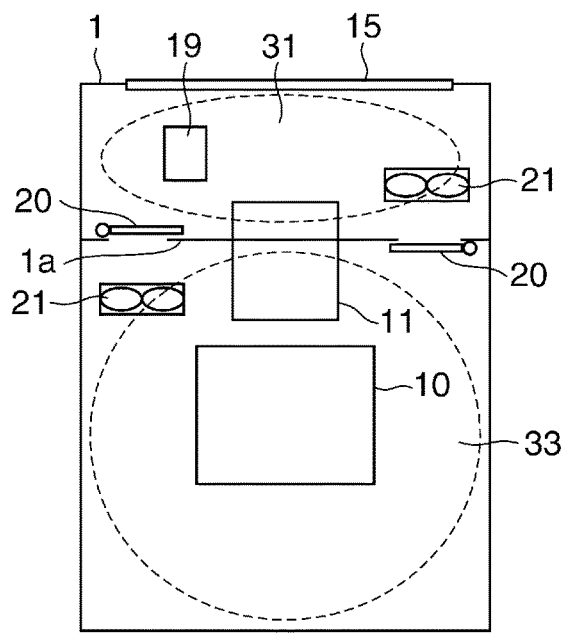
FIGS. 1A and 1B are schematic diagrams useful in conceptually explaining features of a surveillance camera that is an exemplary image pickup apparatus according to the present invention.
Figure 1B:
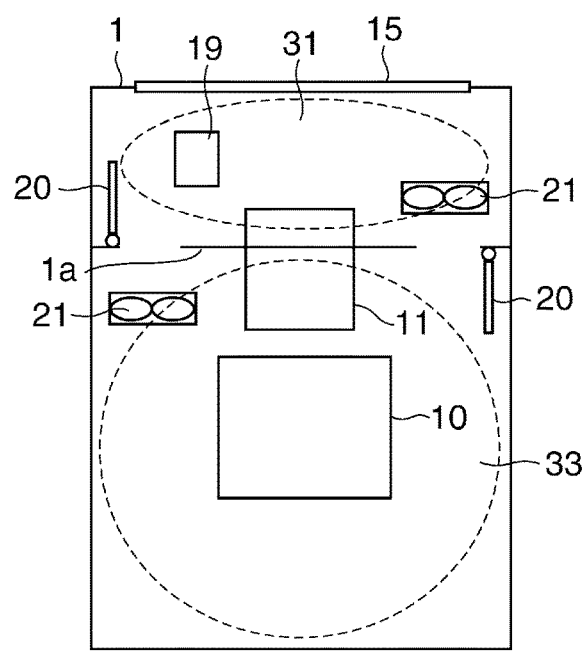

Referring first to FIGS. 1A and 1B, features of a surveillance camera that is an exemplary image pickup apparatus according to the present invention will be conceptually described. FIG. 1A is a schematic diagram showing a state of the surveillance camera in a first control mode, and FIG. 1B is a schematic diagram showing a state of the surveillance camera in a second control mode. It should be noted that examples given here correspond to first through third embodiments, to be described later.

In the surveillance camera in FIGS. 1A and 1B, a window unit 15 is provided on a front side (subject side) of a camera main body 1, and a space inside the camera main body 1 is divided into a first closed space 31 on the front side and a second closed space 33 on a rear side by a partition wall 1a. A lens unit 11 is supported by the partition wall 1a, and valve members 20 are provided on both sides of the lens unit 11 such that the valve members 20 are able to open and close. A fan 21 and a heater 19, which is an exemplary heater, are placed in the first closed space 31, and the fan 21 and a control substrate 10 are placed in the second closed space 33.

In the first control mode in FIG. 1A, the valve members 20 are closed. When the heater 19 is turned on in this state, the first closed space 31 is heated by heat of the heater 19, thereby heating the window unit 15 placed in the first closed space 31 and a shooting opening of the lens unit 11 within a short period of time.

On the other hand, in a second control mode in FIG. 1B, when, for example, the control substrate 10 placed in the second closed space 33 is to be cooled, the fan 21 is run with the heater 19 off to cause a difference in atmospheric pressure between the first closed space 31 and the second closed space 33. As a result, the valve members 20 are opened, causing the air in the camera main body 1 to be stirred, and the stirred air cools the inside of the camera main body 1 to cool the control substrate 10.

Figure 2A:
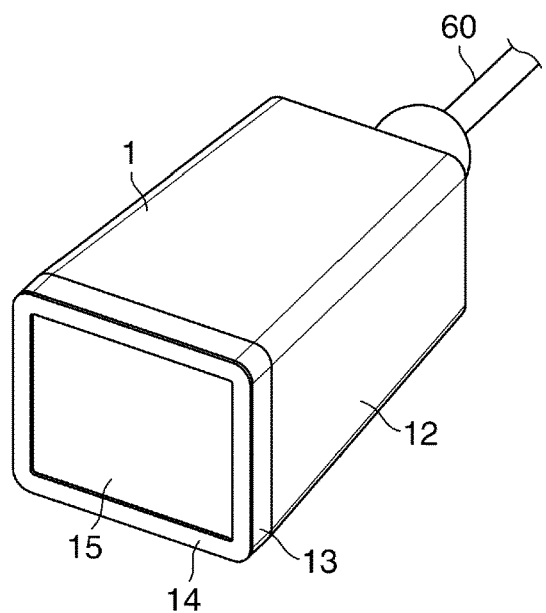
FIG. 2A is a perspective view showing a surveillance camera that is a first embodiment of the image pickup apparatus according to the present invention.
Figure 2B:
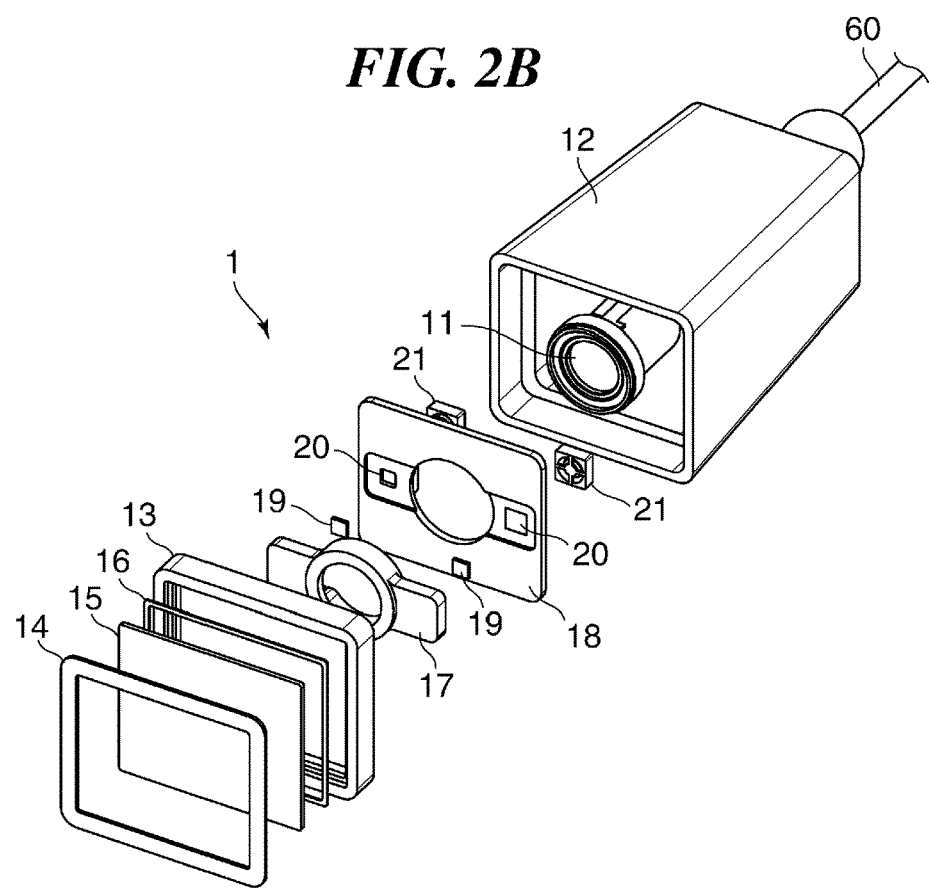
FIG. 2B is an exploded perspective view showing the surveillance camera in FIG. 2A.

FIG. 2A is a perspective view showing a surveillance camera that is a first embodiment of the image pickup apparatus according to the present invention, and FIG. 2B is an exploded perspective view showing the surveillance camera in FIG. 2A. It should be noted that in the following description of the present embodiment, elements corresponding to those of the surveillance camera in FIGS. 1A and 1B are denoted by the same reference symbols in FIGS. 2A and 2B.

As shown in FIG. 1A, in the surveillance camera according to the present embodiment, a cable 60 is connected to a camera main body 1, and the cable 60 is electrically connected to a control substrate 10 (see FIG. 3) provided inside the camera main body 1 to supply power and carry out data communications. The camera main body 1, which has a sealed structure, is provided inside a protective cover, not shown, so as to be protected from matters flying from outside, wind and rain, external force, direct sunlight, and so forth. Here, the camera main body 1 corresponds to an exemplary main case of the present invention.

As shown in FIG. 2B, the camera main body 1 has a main case 12 and a front case 13, which is placed on a front side of the main case 12. A lens unit 11 and the control substrate 10 (see FIG. 3) are provided inside the main case 12. A window unit 15 such as a light transmissive transparent cover and a receiving unit 16 comprised of an elastic member such as rubber are fixed to the front case 13 in a state of being sandwiched between the front case 13 and a fixing member 14, and the fixing member 14 is fastened to the main case 12. The window unit 15 causes a bundle of rays from a subject to fall upon the lens unit 11.

A light-shielding member 17 and a light-shielding plate 18 are placed between the lens unit 11 and the window unit 15. A heater 19 is attached to the light-shielding member 17, and valve members 20, which are made of an elastic plate material or the like and opened and closed due to a difference in atmospheric pressure, are attached to the light-shielding plate 18. A fan 21 is attached to the light-shielding plate 18.

Figure 3:
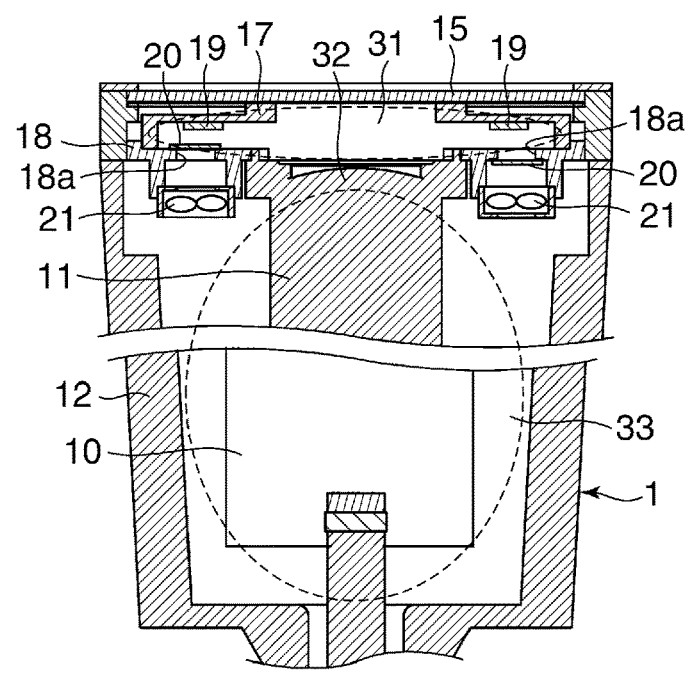
FIG. 3 is a cross-sectional view showing essential parts of a camera main body.

FIG. 3 is a cross-sectional view showing essential parts of the camera main body 1. As shown in FIG. 3, the light-shielding member 17 has a front side thereof abutting against the window unit 15 in a sealed state and has a rear side thereof abutting against the light-shielding plate 18 in a sealed state. The light-shielding plate 18 also abuts against the lens unit 11 in a sealed state. As a result, a first closed space 31 is formed in a space surrounded by a shooting opening 32 of the lens unit 11, the window unit 15, the light-shielding member 17, and the light-shielding plate 18. The valve members 20, which are attached to the light-shielding plate 18, and the heater 19, which is attached to a rear surface of the light-shielding member 17, are placed in the first closed space 31.

In an internal space of the camera main body 1, a second closed space 33 surrounded by the main case 12, the lens unit 11, and the light-shielding plate 18 is formed in a space other than the first closed space 31, and the control substrate 10 is placed in the second closed space 33. In the state shown in FIG. 3, the valve members 20 are bonded to the light-shielding plate 18 in a state of being sealed by pressing openings 18a formed in the light-shielding plate 18 such that the valve members 20 are able to open and close. The valve members 20 separate the first closed space 31 and the second closed space 33.

Assuming that the surveillance camera is to be used in this state in a low-temperature environment such as below breezing, even when an image pickup device of the lens unit 11 placed in the second closed space 33 and electronic components mounted on the control substrate 10 rise in temperature, moisture on their surfaces does not move to the first closed space 31. For this reason, when temperature has decreased to such a temperature that condensation or frosting would form on the window unit 15 and the shooting opening 32 of the lens unit 11, only the first closed space 31 can be exclusively heated by turning on and operating the heater 19. Thus, a target area where temperature has dropped to such a temperature that condensation, frosting, or the like would form is heated to a required temperature to prevent occurrence of condensation or frosting.

Here, whether or not temperature has dropped to such a temperature that condensation, frosting, or the like would occur is determined, and the heater 19 is turned on by a CPU or the like of the control substrate 10 based on image data obtained from the image pickup device of the lens unit 11 or information obtained from a temperature sensor or the like, not shown, mounted on the control substrate 10. This control mode is defined as a first control mode.

Figure 4:
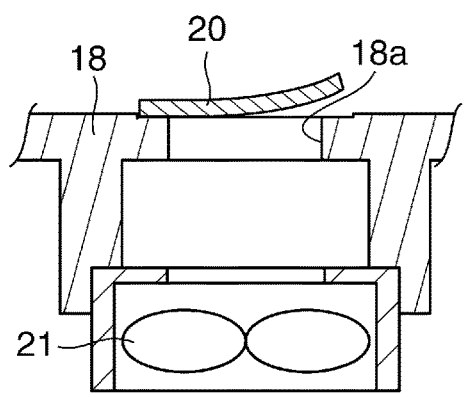
FIG. 4 is a cross-sectional view showing essential parts in a state where valve members attached to a light-shielding plate are opened.

Referring next to FIGS. 3 and 4, a description will be given of how the valve members 20 are opened. FIG. 4 is a cross-sectional view showing essential parts in a state where the valve members 20 attached to the light-shielding plate 18 are opened. In the state shown in FIG. 3, the valve members 20 separate the first closed space 31 and the second closed space 33 as described earlier.

When a need to cool the control substrate 10 and the image pickup device arises in this state due to an increase in temperatures of the electronic components on the control substrate 10 and the image pickup device, the heater 19 is turned off to stop operating, and the fan 21 is run. This causes a difference in atmospheric pressure between the first closed space 31 and the second closed space 33 to, as shown in FIG. 4, open the valve members 20. As a result, air flows between the first closed space 31 and the second closed space 33 to stir air in the internal space of the camera main body 1 through the opening 18a, causing heat in the camera main body 1 to disperse through walls of the main case 12 and others.

Here, whether or not the need to cool the control substrate 10 or the like arises is determined, the heater 19 is turned off, and the fan 21 is turned on by the CPU or the like of the control substrate 10 based on information from the temperature sensor or the like, not shown, mounted on the control substrate 10. This control mode is defined as a second control mode.

Moreover, when temperature has dropped to such a temperature that condensation would form on the window unit 15 or the like even though temperature has not dropped to below freezing, the fan 21 may be run to open the valve members 20, and also, the heater 19 may be turned on to heat the internal space of the camera main body 1 so as to prevent condensation.

Here, whether or not temperature has dropped to such a temperature that condensation would form on the window unit 15 or the like is determined, the heater 19 is turned on, and the fan 21 is turned on by the CPU or the like of the control substrate 10 based on information from the temperature sensor or the like, not shown, mounted on the control substrate 10. This control mode is defined as a third control mode.

It should be noted that although in the present embodiment, the CPU or the like of the control substrate 10 determines a control mode and controls driving of the heater 19 and the fan 21 based on image data obtained from the image pickup device or detection information from the temperature sensor, this is not limitative.

For example, based on image data obtained from the image pickup device or detection information from the temperature sensor, an operator may determine a control mode and turn on or off the heater 19 and the fan 21. The surveillance camera may be used as a network camera. For example, the image monitoring system may be constructed by connecting the control substrate 10 of the surveillance camera and a server (monitoring apparatus) at an outside image monitoring center or the like together via a wireless or wired connection to carry out communications. With the image monitoring system, an outside person in charge of surveillance or the server determines a control mode based on image data obtained from an image pickup device or detection information from a temperature sensor, and via a communication means, instructs the CPU or the like of the control substrate 10 to turn on or off the heater 19 and the fan 21.

As described above, in the present embodiment, the internal space of the camera main body 1 is divided into the first closed space 31 and the second closed space 33, and the first closed space 31 is exclusively heated, or both the first closed space 31 and the second closed space 33 are heated and cooled. Since only the first closed space 31 in which the window unit 15 and the shooting opening 32 of the lens unit 11 are placed is exclusively heated in a low-temperature environment such as below freezing, a target to be heated is heated to such a temperature that condensation and frosting would not occur in a short period of time. As a result, an image with high sharpness is obtained within a short period of time using a simple structure when the camera is operated in a low-temperature environment.

Figure 5:
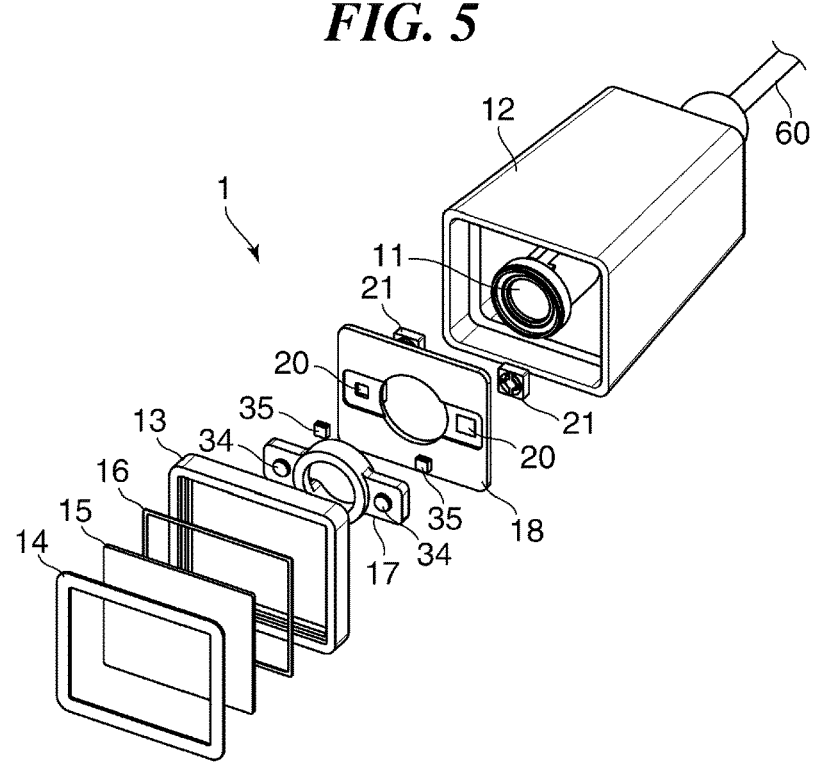
FIG. 5 is an exploded perspective view showing a surveillance camera that is a second embodiment of the image pickup apparatus according to the present invention.
Figure 6:
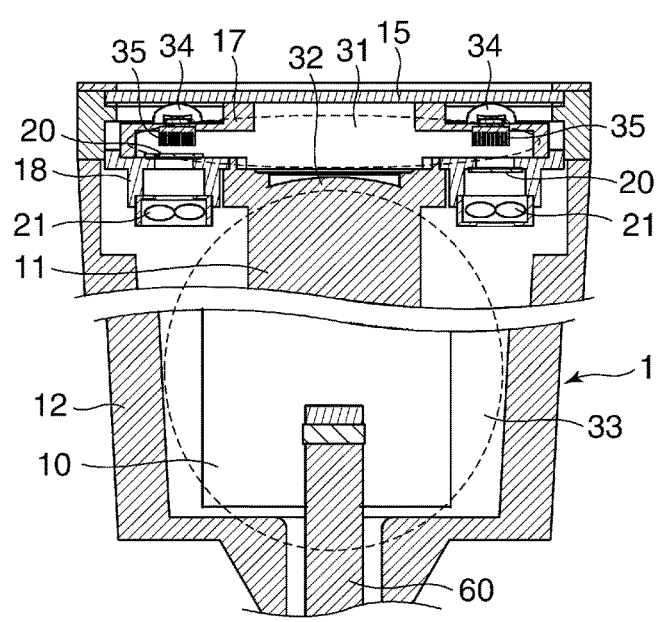
FIG. 6 is a cross-sectional view showing essential parts of a camera main body in FIG. 5.

Referring next to FIGS. 5 and 6, a description will be given of a surveillance camera that is a second embodiment of the image pickup apparatus according to the present invention. FIG. 5 is an exploded perspective view showing a camera main body of the surveillance camera. FIG. 6 is a cross-sectional view showing essential parts of the camera main body in FIG. 5. It should be noted that in the following description of the present embodiment, elements corresponding to those of the first embodiment described above are designated by the same reference symbols in the figures, and description thereof is omitted.

The present embodiment differs from the first embodiment described above in that an illumination unit 34, which radiates a subject with illumination light, is attached to a front side of a light-shielding member 17, and instead of the heater 19, a heat sink 35 is attached to a rear side of the light-shielding member 17.

The heat sink 35 is thermally connected to the illumination unit 34 with the light-shielding member 17 sandwiched between the heat sink 35 and the illumination unit 34. Illumination light emitted from the illumination unit 34 repeats diffused reflection within a wall thickness of a window unit 15 to enter a lens unit 11. Only a ray of light that has experienced repeated diffused reflection to a sufficient degree by the light-shielding member 17 enters the lens unit 11, and hence an intensity of the ray of light has dropped to such an intensity as not to affect an image obtained by an image pickup device of the lens unit 11. Heat generated in the illumination unit 34 when the illumination light is emitted from it is absorbed by the heat sink 35 and radiated into a first closed space 31.

Here, in a first control mode, whether or not temperature has dropped to such a temperature that condensation, frosting, or the like would form is determined, and the illumination unit 34 is turned on by a CPU or the like of a control substrate 10 based on image data obtained from the image pickup device and information from a temperature sensor or the like, not shown, mounted on the control substrate 10.

In a second control mode, whether or not a need to cool the control substrate 10 or the like arises is determined, the illumination unit 34 is turned off, and the fan 21 is turned on by the CPU or the like of the control substrate 10 based on information supplied from the temperature sensor or the like, not shown, mounted on the control substrate 10.

In a third control mode, whether or not temperature has dropped to such a temperature that condensation would form on the window unit 15 or the like is determined, the illumination unit 34 is turned on, and the fan 21 is turned on by the CPU or the like of the control substrate 10 based on information from the temperature sensor or the like, not shown, mounted on the control substrate 10.

As described above, in the present embodiment, instead of the heater 19, the heat sink 35 thermally connected to the illumination unit 34 is used as the heat generating means. Thus, even if the heater 19 is not additionally installed, condensation and frosting are prevented from forming on the window unit 15 and the shooting opening 32 of the lens unit 11.

It should be noted that although in the present embodiment, the heater 19 is not installed, the first closed space 31 may be heated using the heater 19, the illumination unit 34, and the heat sink 35. The other constitution and operational advantages are the same as those of the first embodiment described above.

Figure 7A:
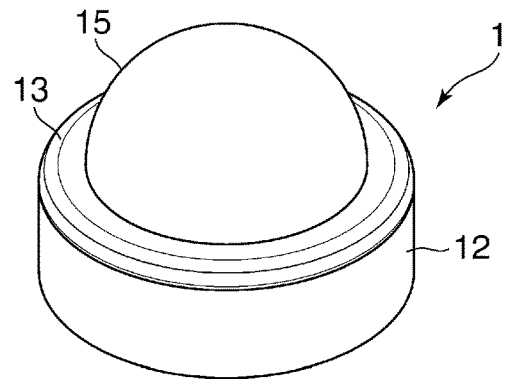
FIG. 7A is a perspective view showing a surveillance camera that is a third embodiment of the image pickup apparatus according to the present invention.
Figure 7B:
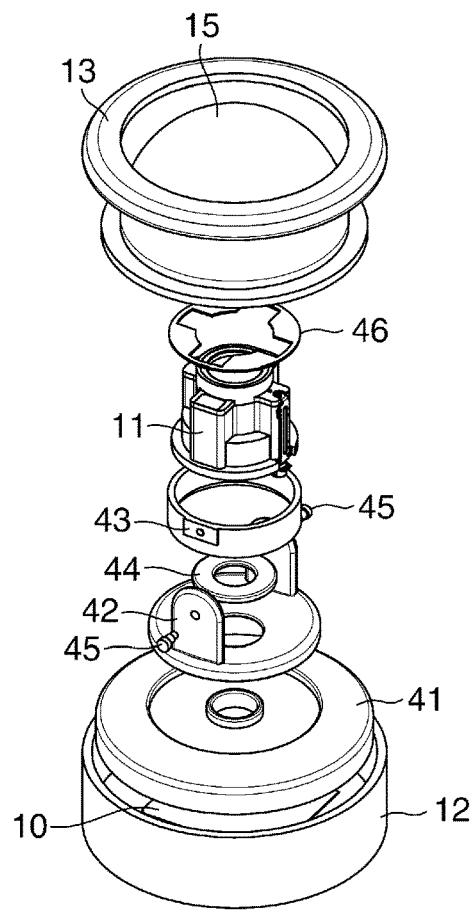
FIG. 7B is an exploded perspective view showing a camera main body in FIG. 7A.
Figure 8:
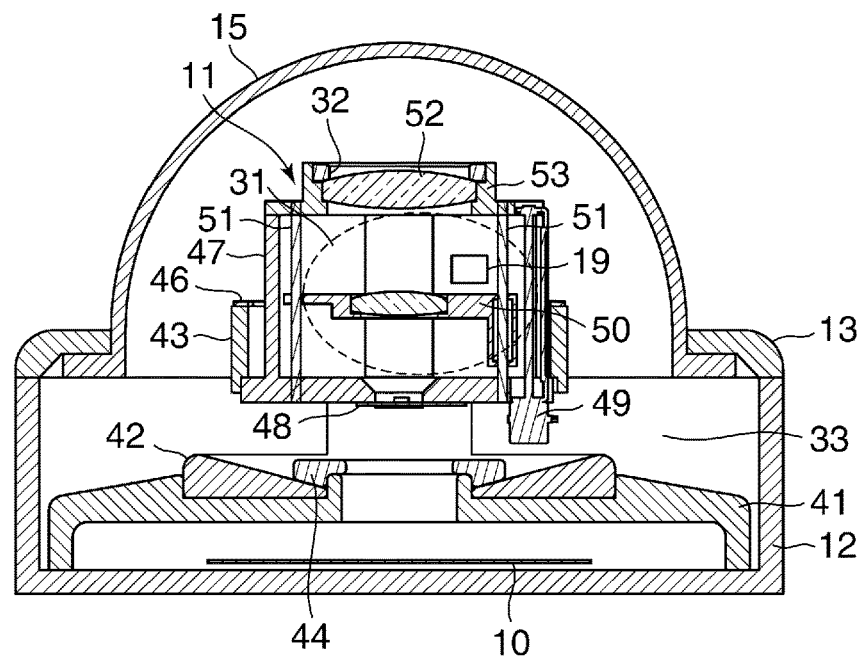
FIG. 8 is a cross-sectional view showing the camera main body.
Figure 9:
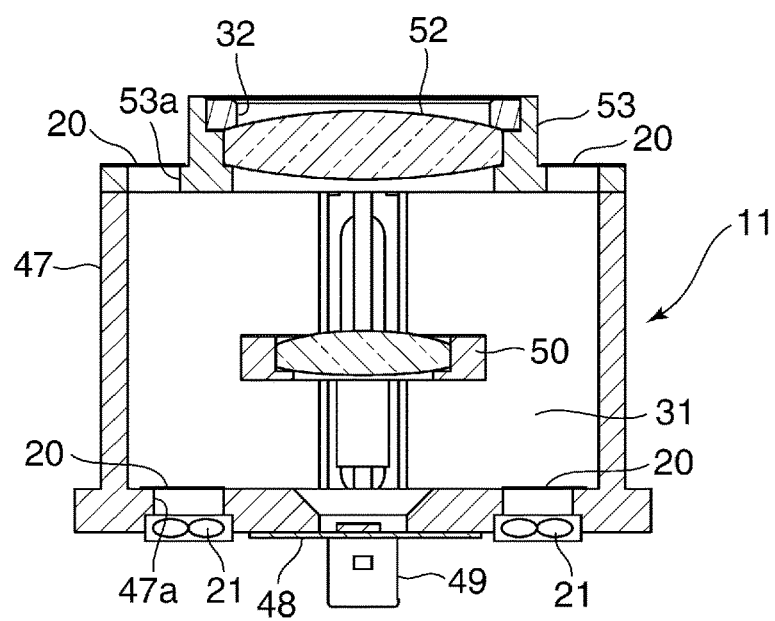
FIG. 9 is a cross-sectional view showing a lens unit at locations of valve members.

Referring next to FIGS. 7 to 9, a description will be given of a surveillance camera that is a third embodiment of the image pickup apparatus according to the present invention. It should be noted that in the following description of the present embodiment, elements corresponding to those of the first embodiment described above are designated by the same reference symbols in the figures.

FIG. 7A is a perspective view showing a camera main body of the surveillance camera, and FIG. 7B is an exploded perspective view showing the camera main body in FIG. 7A.

In the surveillance camera according to the present embodiment, as shown in FIGS. 7A and 7B, a control substrate 10 is provided inside a main case 12 of the camera main body 1 having a sealed structure, and a cable, not shown, is electrically connected to the control substrate 10 to supply power and carry out data communications.

In the main case 12, a lens unit 11 is supported such that it is rotatable in a panning direction via a rotation supporting units 41 and 44, a tilting direction via rotation supporting units 42 and 45, and a rotational direction via rotation supporting units 43 and 46. It should be noted that the lens unit 11 is rotated in these directions by a drive means such as a motor.

A window unit 15 is comprised of a domical transparent cover or the like. The window unit 15 is fixed to a front case 13, which is fixed to the main case 12 via a seal packing, not shown, or the like.

FIG. 8 is a cross-sectional view showing the camera main body 1. FIG. 9 is a cross-sectional view showing the lens unit 11 at locations of valve members 20.

As shown in FIG. 8, the lens unit 11 has a cylindrical lens base 47, and an image pickup device 48 and a motor unit 49 are provided at a lower end of the lens base 47. The motor unit 49 has a motor and a feed screw mechanism, not shown, and the motor drives the feed screw mechanism to move a movable lens holder 50 in a direction of an optical axis along a guide bar 51 provided on the lens base 47, thus attaining a focus. It should be noted that a focus may be attained by, for example, moving the image pickup device 48 in the direction of the optical axis or using an insertion-removal mechanism of an optical filter, not shown.

A fixed lens holder 53, which holds a fixed lens 52, is attached to an upper end portion of the lens base 47. This forms a first closed space 31 inside the lens unit 11. A heater 19 is provided in the first closed space 31. In an internal space of the camera main body 1, a second closed space 33 is formed in a space other than the first closed space 31.

As shown in FIG. 9, the valve members 20 are bonded to the lens base 47 and the fixed lens holder 53 in a state of being sealed while pressing an opening 47a and an opening 53a formed in the lens base 47 and the fixed lens holder 53, respectively such that the valve members 20 are able to open and close. The valve member 20 on the lens base 47 side separates the first closed space 31 and the second closed space 33 on the main case 12 side, and the valve member 20 on the fixed lens holder 53 side separates the first closed space 31 and the second closed space 33 on the window unit 15 side.

In this state, when, for example, sliding characteristics of sliding portions of the motor and the feed screw mechanism of the motor unit 49, which drives the lens unit 11, and sliding portions of the guide bar 51 and the movable lens holder 50 change in a low-temperature environment to decrease ease of control over an optical drive system, the heater 19 is turned on. As a result, the first closed space 31 is exclusively heated to warm the sliding portions mentioned above within a short period of time, and an image with high sharpness is obtained within a short period of time while a decrease in ease of control over the optical drive system is prevented.

Here, whether or not sliding characteristics of the drive unit for the lens unit 11 have changed is determined, and the heater 19 is turned on by a CPU or the like of the control substrate 10 based on information from a temperature sensor or the like, not shown, mounted on the control substrate 10. In the present embodiment, this control mode is defined as a first control mode.

Moreover, when temperature has dropped to a temperature such as below freezing at which condensation or frosting would form on the domicile window unit 15 or a shooting opening 32 of the lens unit 11, the heater 19 is turned on, and a fan 21 provided close to the valve member 20 on the lens base 47 side is run.

Running the fan 21 causes a difference in atmospheric pressure between the first closed space 31 and the second closed space 33 to open the valve members 20. At this time, air flows from the second closed space 33 on the main case 12 side into the first closed space 31 through the opening 47a, and the air is heated by the heater 19.

The air heated in the first closed space 31 is blown out from the first closed space 31 into the second closed space 33, which is located between the window unit 15 and the shooting opening 32, through the opening 53a and blown onto the window unit 15. As a result, a target area that has cooled to such a temperature that condensation or frosting would occur is heated to a required temperature, and this prevents occurrence of condensation or frosting.

Whether temperature has dropped to such a temperature that condensation or frosting would occur is determined, the heater 19 is turned on, and the fan 21 is turned on by the CPU or the like of the control substrate 10 based on image data obtained from the image pickup device 48 or information from the temperature sensor or the like, not shown, mounted on the control substrate 10. In the present embodiment, this control mode is defined as a second control mode.

Furthermore, when a need to cool the control substrate 10 and the image pickup device 48 arises due to an increase in temperatures of electronic components on the control substrate 10 and the image pickup device 48, the heater 19 is turned off to stop operating, and the fan 21 is run. This causes a difference in atmospheric pressure between the first closed space 31 and the second closed space 33 to open the valve members 20. As a result, air flows between the first closed space 31 and the second closed space 33 to stir air in the internal space of the camera main body 1, causing heat in the camera main body 1 to disperse through walls of the main case 12 and others.

Here, whether or not the need to cool the control substrate 10 or the like arises is determined, the heater 19 is turned off, and the fan 21 is turned on by the CPU or the like of the control substrate 10 based on information from the temperature sensor or the like, not shown, mounted on the control substrate 10. This control mode is defined as a third control mode.

It should be noted that although in the present embodiment, the CPU or the like of the control substrate 10 determines a control mode and controls driving of the heater 19 and the fan 21 based on image data obtained from the image pickup device 48 or detection information from the temperature sensor, a control mode should not necessarily be determined in this manner.

For example, based on image data obtained from the image pickup device 48 or detection information from the temperature sensor, an operator may determine a control mode and turn on or off the heater 19 and the fan 21. The surveillance camera may be used as a network camera. For example, the control substrate 10 of the surveillance camera and a server at an outside image monitoring center or the like may be connected together via a wireless or wired connection to carry out communications, and an outside person in charge of surveillance or the server determines a control mode based on image data obtained from an image pickup device 48 or detection information from a temperature sensor. In this case, the CPU or the like of the control substrate 10 is instructed from outside, via a communication means, to turn on or off the heater 19 and the fan 21.

As described above, in the present embodiment, the internal space of the camera main body 1 is divided into the first closed space 31 and the second closed space 33, and only the first closed space 31 is heated, or both the first closed space 31 and the second closed space 33 are heated and cooled. Since only the first closed space 31, in which the drive unit for the lens unit 11 is placed, is exclusively heated in a low-temperature environment, the sliding portion of the lens drive unit is heated within a short period of time, thus avoiding a decrease in ease of control over the optical drive system. As a result, an image with high sharpness is obtained within a short period of time using a simple structure when the camera is operated in a low-temperature environment.

Figure 10:
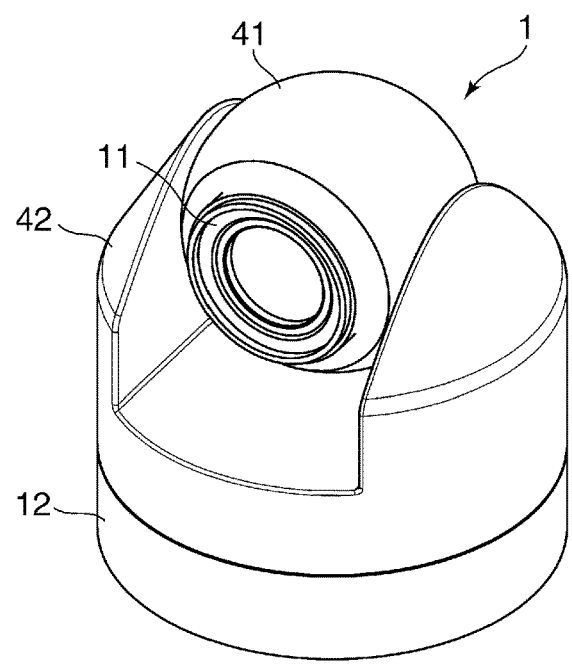
FIG. 10 is a perspective view showing a camera main body of a surveillance camera that is a fourth embodiment of the image pickup apparatus according to the present invention.
Figure 11:
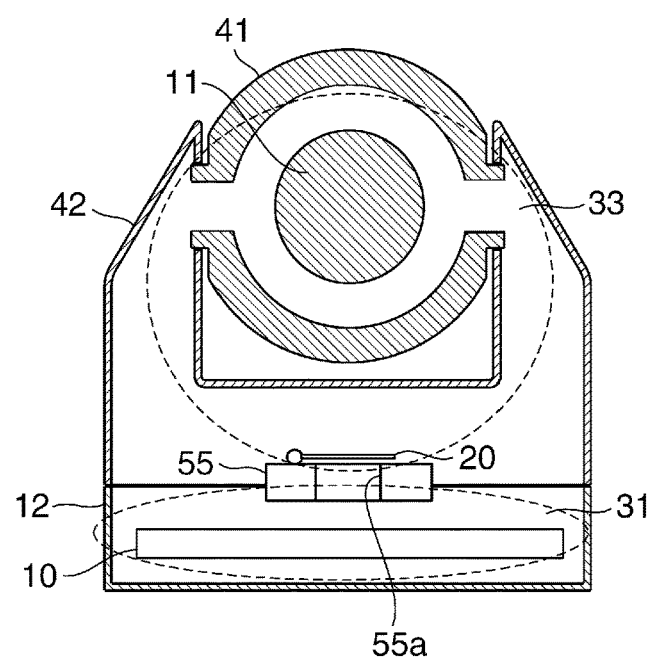
FIG. 11 is a cross-sectional view schematically showing the camera main body in FIG. 10.

Referring next to FIGS. 10 and 11, a description will be given of a surveillance camera that is a fourth embodiment of the image pickup apparatus according to the present invention. It should be noted that in the surveillance camera according to the present embodiment, neither the heater 19 nor the fan 21, which the surveillance cameras according to the first through third embodiments described above have, is installed.

FIG. 10 is a perspective view showing a camera main body of the surveillance camera that is the fourth embodiment of the image pickup apparatus according to the present invention. FIG. 11 is a cross-sectional view schematically showing the camera main body in FIG. 10. It should be noted that in the following description of the present embodiment, elements corresponding to those of the third embodiment described above are designated by the same reference symbols in the figures.

In the surveillance camera according to the present embodiment, as shown in FIGS. 10 and 11, a control substrate 10 is provided inside a main case 12 of the camera main body 1 having a sealed structure, and a cable, not shown, is electrically connected to the control substrate 10 to supply power and carry out data communications.

A lens unit 11 is provided inside a rotary base 41, which is supported such that it is rotatable in a panning direction with respect to a rotary base 42The rotary base 42 is supported such that it is rotatable in a tilting direction with respect to the main case 12 via a rotating member 55. The rotary bases 41 and 42 are rotatively driven in the corresponding directions by driving means such as motors. Moreover, the surveillance camera according to the present embodiment has an angle sensor which detects a rotational angle of the rotary base 41 in the panning direction with respect to the rotary base 42, and an angle sensor which detects a rotational angle of the rotary base 42 in the tilting direction with respect to the main case 12.

A valve member 20 is bonded to the rotating member 55, which is interposed between the main case 12 and the rotary base 42, such that it is able to open and close in a state of being sealed while pressing an area around an opening 55a formed in the rotating member 55. In this state, a first closed space 31 sealed by the rotating member 55 and the valve member 20 is formed inside the main case 12. In the present embodiment, the valve member 20 is driven to open and close by a drive unit, not shown.

In an internal space of the camera main body 1, a second closed space 33 is formed in a space other than the first closed space 31. In the present embodiment, an internal space of the rotary base 41 and an internal space of the rotary base 42 are in communication with each other via a rotation supporting unit that supports the rotary base 41 with respect to the rotary base 42. Thus, in the present embodiment, the second closed space 33 is formed by the internal space of the rotary base 41 and the internal space of the rotary base 42.

When in a low-temperature environment or the like, sliding characteristics of the rotation supporting unit for the rotary base 41 and the rotary base 42 or a sliding portion of the rotating member 55 change to bring about a decrease in ease of control over an orientation of the lens unit 11, the valve member 20 is opened. In this state, air warmed by heat of the control substrate 10 in the first closed space 31 flows into the second closed space 33 through the opening 55a and propagates through air to the rotation supporting unit for the rotary base 41 and the rotary base 42 and the sliding portion of the rotating member 55.

As a result, the rotation supporting unit for the rotary base 41 and the rotary base 42 and the sliding portion of the rotating member 55 are warmed within a short period of time, and this improves sliding characteristics of the rotation supporting unit for the rotary base 41 and the rotary base 42 and the sliding portion of the rotating member 55. As a result, the lens unit 11 is quickly oriented in a target direction to obtain a target image within a short period of time.

Here, whether or not sliding characteristics of the rotation supporting unit for the rotary base 41 and the rotary base 42 and the sliding portion of the rotating member 55 change in a low-temperature environment or the like to decrease ease of control is determined by a CPU or the like of the control substrate 10.

Specifically, first, the CPU or the like of the control substrate 10 judges whether or not a temperature detected by a temperature sensor, not shown, mounted on the control substrate 10 is as low as below a set temperature determined in advance.

Also, when an angle detected by the angle sensor in the panning direction and/or the tilting direction described earlier is smaller than a set angle determined in advance, the CPU or the like of the control substrate 10 judges that sliding characteristics of the rotation supporting unit for the rotary base 41 and the rotary base 42 and the sliding portion of the rotating member 55 have changed.

Upon judging that the detected temperature is as low as below the set temperature, and the sliding characteristics have changed, the CPU or the like of the control substrate 10 controls the drive unit for the valve member 20 to drive the valve member 20 in an opening direction. In the present embodiment, this control mode is defined as a first control mode.

On the other hand, upon judging that the detected temperature is not as low as below the set temperature, and the sliding characteristics have not changed, or upon judging that the detected temperature is as low as below the set temperature and the sliding characteristics have not changed, the CPU or the like of the control substrate 10 keeps the valve members 20 closed. In this state, when it is necessary to cool an image pickup device of the lens unit 11 disposed inside the rotary base 41, convection of air occurs in the internal space of the rotary base 41 and the internal space of the rotary base 42 in the second closed space 33 to radiate heat using surface areas of the rotary base 41 and the rotary base 42. At this time, heat of the control substrate 10 placed in the first closed space 31 is prevented from propagating to the image pickup device of the lens unit 11 through air. In the present embodiment, this control mode is defined as a second control mode.

It should be noted that upon judging that the detected temperature is not as low as below the set temperature, and the sliding characteristics have changed, the CPU or the like of the control substrate 10 may issue an alarm or the like based on a determination that a mechanical failure occurs in the rotation supporting unit for the rotary base 41 and the rotary base 42 or the sliding portion of the rotating member 55.

When a need to cool the control substrate 10 arises due to a temperature increase of electronic components on the control substrate 10, the valve member 20 is opened. In this state, air heated to high temperature in the first closed space 31 flows into the second closed space 33 through the opening 55a to stir air in the internal space of the camera main body 1. Thus, heat inside the camera main body 1 is radiated through walls of the rotary base 41, the rotary base 42, and so forth.

Here, whether or not the need to cool the control substrate 10 or the like arises is determined, and the valve member 20 is opened by the CPU or the like of the control substrate 10 based on information from a temperature sensor or the like, not shown, mounted on the control substrate 10. In the present embodiment, this control mode is defined as a third control mode.

It should be noted that although in the present embodiment, the CPU or the like of the control substrate 10 determines a control mode and controls driving of the valve member 20 based on detection information from the temperature sensor or the angle sensor, a control mode should not necessarily be determined in this manner.

For example, based on detection information from the temperature sensor or the angle sensor, an operator may determine a control mode and open or close the valve member 20. The surveillance camera may be used as a network camera. For example, the control substrate 10 of the surveillance camera and a server at an outside image monitoring center or the like may be connected together via a wireless or wired connection to carry out communications, and a person in charge of surveillance or the server determines a control mode based on detection information from the temperature sensor or the angle sensor. In this case, the CPU or the like of the control substrate 10 is instructed from outside, via a communication means, to open or close the valve members 20.

As described above, in the present embodiment, the internal space of the camera main body 1 is divided into the first closed space 31 and the second closed space 33, and the valve members 20 are placed between the first closed space 31 and the second closed space 33 and are controlled to be opened and closed. By opening the valve members 20 in a low-temperature environment, air that has already been heated in the first closed space 31 by heat of the control circuit 10 is introduced into the second closed space 33 to heat the rotation supporting unit and the sliding portion. Thus, the rotation supporting unit and the sliding portion are heated within a short period of time, thus improving sliding characteristics to ensure smooth rotation of the lens unit 11 in the panning direction and the tilting direction. As a result, an image with high sharpness is obtained using a simple structure within a short period of time when the camera is operated in a low-temperature environment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-090977, filed Apr. 28, 2016 which is hereby incorporated by reference herein in its entirety.

What is claimed is:
1. An image pickup apparatus comprising:
   a main case configured to have, in an internal space thereof, a lens unit and a heater, the internal space being divided into a first closed space and a second closed space via an opening;
   a valve member configured to open and close the opening;
   a temperature sensor configured to detect a temperature of the internal space;
   a valve opening and closing actuator configured to open and close the valve member; and
   a controller configured to control opening and closing actions of the valve member,
   wherein, based on information about a temperature detected in the internal space by the temperature sensor, the controller determines whether to open or close the valve member using the valve opening and closing actuator, thus controlling opening and closing actions of the valve member by the valve opening and closing actuator.

2. The image pickup apparatus according to claim 1, wherein the valve opening and closing actuator is a drive unit that drives the valve member to open and close.

3. The image pickup apparatus according to claim 1, wherein the heater is an electronic component that is mounted on a substrate and placed in the first closed space, and
the lens unit is placed in the second closed space.

4. The image pickup apparatus according to claim 1, wherein a lens drive mechanism, which drives a lens holder constituting the lens unit in a direction of an optical axis, and the heater are placed in the first closed space.

5. The image pickup apparatus according to claim 4, wherein the heater is a heater.

6. The image pickup apparatus according to claim 4, wherein the valve opening and closing actuator is a fan that is run to cause a difference in atmospheric pressure between the first closed space and the second closed space and open the valve member.

7. The image pickup apparatus according to claim 4, wherein based on information about a temperature detected in the internal space by the temperature sensor, and image data obtained from an image pickup device which the lens unit has, the controller determines whether to open/close the valve member using the valve opening and closing actuator, thus controlling opening and closing actions of the valve member by the valve opening and closing actuator.

8. The image pickup apparatus according to claim 1, wherein a cover that protects a shooting opening of the lens unit and causes a bundle of rays from a subject to fall upon the lens unit is provided on the first closed space side of the internal space, and
the shooting opening and the heater are placed in the first closed space.

9. The image pickup apparatus according to claim 8, further comprising an-illumination device configured to radiate a subject with illumination light,
wherein the heater is a member that absorbs and radiates heat generated by the illumination device.

10. An image monitoring system comprising:
an image pickup apparatus; and
a surveillance apparatus configured to be connected to the image pickup apparatus such that the surveillance apparatus is able to carry out communications with the image pickup apparatus via a communication device,
wherein the image pickup apparatus comprises:
a main case that has, in an internal space thereof, a lens unit and a heater, the internal space being divided into a first closed space and a second closed space via an opening;
a valve member that opens and closes the opening;
a temperature sensor that detects a temperature of the internal space;
valve opening and closing actuator that opens and closes the valve member; and
a controller that controls opening and closing actions of the valve member, and
wherein the surveillance apparatus comprises:
one or more processors; and
at least one memory coupled to the one or more processors, the at least one memory having instructions stored thereon which, when executed by the one or more processors, cause the surveillance apparatus to:
obtain, via the communication device, information about a temperature of the internal space detected by the temperature sensor; and
instruct, via the communication device, the controller to cause the valve opening and closing actuator to open and close the valve member.

11. An image monitoring system comprising:
an image pickup apparatus; and
a surveillance apparatus configured to be connected to the image pickup apparatus such that the surveillance apparatus is able to carry out communications with the image pickup apparatus via a communication device,
wherein the image pickup apparatus comprises:
a main case that has, in an internal space thereof, a lens unit and a heater, the internal space being divided into a first closed space and a second closed space via an opening;
a valve member that opens and closes the opening;
a temperature sensor that detects a temperature of the internal space;
a valve opening and closing actuator that opens and closes the valve member; and
a controller that controls opening and closing actions of the valve member, and
wherein a lens drive mechanism, which drives a lens holder constituting the lens unit in a direction of an optical axis, and the heater are placed in the first closed space, and
wherein the surveillance apparatus comprises:
one or more processors; and
at least one memory coupled to the one or more processors, the at least one memory having instructions stored thereon which, when executed by the one or more processors, cause the surveillance apparatus to:
obtain, via the communication device, information about a temperature of the internal space detected by the temperature sensor, and image data obtained from an image pickup device which the lens unit has; and
instruct, via the communication device, the controller to cause the valve opening and closing unit actuator to open and close the valve member.

* * * * *